Patented July 16, 1935

2,008,620

UNITED STATES PATENT OFFICE 2,008,620

WRITING INK

William Boast Marshall, London, England

No Drawing. Application June 24, 1932, Serial No. 619,166. In Great Britain February 25, 1932

1 Claim. (Cl. 134—37)

This invention relates to writing inks containing iron compounds and tannic acid.

As is well known, these inks are colloidal solutions which contain both positively and negatively charged particles.

It has been found that if all the electric charges on the colloidal particles in the ink are converted to one and the same charge be this positive or negative, then the tendency of the colloidal particles to precipitate is very materially reduced and in the case where all the charges are converted to positive charges the tendency of the ink to corrode the steel nibs is also materially reduced.

According to the process of the present invention, a substance or mixture of substances is added to the ink in order to convert all the electric charges on the colloidal particles into one and the same charge.

According to the preferred form of the process of this invention a substance or mixture of substances is added to the ink in order to convert all the charges on the colloidal particles into positive charges. Suitable substances are normally elements of the fifth group of the periodic table, or which may be any polyvalent element, for example, phosphorus, arsenic, bismuth or antimony or compounds thereof.

The aforesaid substances have the further advantage that they are negative catalysts for the reaction which takes place between the steel of the nibs and the acid present in the ink.

The following example illustrates how the process of the invention may be carried into effect:

28 grms. of gall nuts and 6 grms. of aniline blue are dissolved in 200 litres of boiling water. In a separate vessel 30 grms. of ferrous chloride are dissolved in 200 litres of cold water. The two solutions are then mixed and a little glycerine, which serves as a protective colloid, 30 ccs., of concentrated hydrochloric acid, and one grm. of an arsenic acid are added. The solution is diluted to 1000 litres with water and one grm. of phenol is added thereto.

The following comparative tests illustrate the advantages of the ink prepared according to the present invention.

1. *Natural precipitation test.*—20 ccs. of an ordinary iron-tannic acid ink and 20 ccs. of an ink prepared according to the present invention were each placed in an unstoppered 2 oz. bottle and kept under the same conditions for 30 days. The precipitates were then weighed and calculated as percentages of the original weight of the ink with the following results:

|   | Per cent |
|---|---|
| Ordinary iron-tannic acid ink | 0.383 |
| Ink prepared according to the present invention | 0.030 |

2. *Corrosion test on a steel nib.*—A steel nib was placed in 10 ccs. of an ordinary iron-tannic acid ink and a similar nib was placed in 10 ccs. of the ink according to the present invention and both were kept under the same conditions for 30 days. The nibs were then washed, cleaned and weighed. The loss of weight calculated as a percentage on the original weight of the nib was as follows:

|   | Per cent |
|---|---|
| Nib in ordinary iron-tannic acid ink | 14.30 |
| Nib in ink prepared according to present invention | 1.10 |

3. *Precipitation test by steel nib.*—A steel nib was placed in 20 ccs. of ordinary iron-tannic acid ink and a similar nib was placed in 20 ccs. of ink prepared according to the present invention. In each case the period at which material began to separate out was observed with the following results:

|   | Days |
|---|---|
| Ordinary iron-tannic acid ink | 3 |
| Ink prepared according to the present invention | 15 |

What I claim is:—

An iron-tannic acid writing ink liquid comprising the following ingredients in the following proportions:—

| | |
|---|---|
| Gall nuts | 28 grams. |
| Aniline blue | 6 grams. |
| Ferrous chloride | 30 grams. |
| Glycerine | A small amount. |
| Concentrated hydrochloric acid | 30 ccs. |
| Arsenic acid | 1 gram. |
| Water | 1000 litres. |
| Phenol | 1 gram. |

WILLIAM BOAST MARSHALL.